United States Patent Office 3,746,695
Patented July 17, 1973

3,746,695
INTERPOLYMERS OF POLYCYCLIC POLYUNSATURATED HYDROCARBONS AND CYCLIC OLEFINS
Eilert A. Ofstead, Cuyahoga Falls, Ohio, assignor to The Goodyear Tire & Rubber Company, Akron, Ohio
No Drawing. Continuation-in-part of application Ser. No. 881,275, Dec. 1, 1969. This application June 14, 1971, Ser. No. 152,977
Int. Cl. C08f 15/04
U.S. Cl. 260—88.2 D                2 Claims

ABSTRACT OF THE DISCLOSURE

There is disclosed interpyolymers of cycloolefins and polycyclic polyunsaturated hydrocarbons obtained by a Diels-Alder condensation between a cyclic conjugated diolefin and a cyclic non-conjugated polyunsaturated hydrocarbon containing at least eight carbon atoms in the ring. These copolymers are useful to form rubber-like finished products.

Also disclosed are interpolymers of polyunsaturated hydrocarbons obtained by a Diels-Alder reaction between a cyclic conjugated diolefin and a cyclic non-conjugated diolefin with two alpha olefins such as ethylene and propylene.

---

This application is a continuation-in-part of application Ser. No. 881,275, filed Dec. 1, 1969, entitled "Polycyclic Unsaturated Hydrocarbons and Preparation Thereof," now abandoned.

This invention is directed to interpolymers of cyclic olefins and polycyclic unsaturated hydrocarbons obtained by the Diels-Alder condensation reaction between (a) a cyclic conjugated diolefin and (b) a cyclic non-conjugated polyunsaturated hydrocarbon containing eight carbon atoms in the ring.

It is known that cycloolefins such as cyclopentene, cycloocetene, 1,5-cyclooctadiene, 1,5,9-cyclododecatriene, and other cycloolefins may be polymerized by catalysts known as ring opening polymerization catalysts to give soluble products which range from low molecular weight polymers, such as oils, to high molecular weight solid polymers, such as elastomers.

However, in order to convert these polymers into useful articles, it is necessary to cure them in a manner similar to that of more conventional rubbers, such as liquid polybutadiene, SBR, high cis 1,4-polybutadiene, and natural rubber with such curing agents as sulfur or organic peroxides followed by conventional vulcanization at relatively high temperatures. The conventional cure recipes add substantial cost to the finished product.

Therefore, it would be of considerable value to provide a polymer which would be highly crosslinked during the course of the interpolymerization process, thus allowing liquid monomers to be converted into a finished product.

Thus, it is an object of this invention to provide a polymeric material which can be converted directly from the monomer form to a finished product.

According to the invention, there is provided interpolymers of cyclic olefins and the polycyclic unsaturated hydrocarbons obtained by the Diels-Adler condensation reaction between (A) a cyclic conjugated diolefin selected from the group consisting of the formulae:

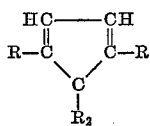

and 1,3-cyclohexadienes of the formula:

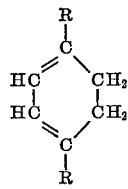

in which the R groups may be hydrogen or an alkyl or aryl radical and can be the same or different with (B) a cyclic non-conjugated polyunsaturated hydrocarbon which:

(a) possesses at least eight and not more than twelve carbon atoms in the ring;
(b) possesses within the ring at leat two vinylenic units of the type —CH=CH—;
(c) may be substituted by hydrogen, alkyl or aryl radicals at any of the ring carbons other than the vinylenic carbons designated in (b) above;
(d) is free of non-aromatic conjugated units; and
(e) is free of acetylenic type of unsaturation.

More specifically, but not limited to, there is provided an interpolymer of a cyclic olefin, such as cyclopentene, cyclooctene, 1,5-cyclooctadiene, 1,5,9-cyclododecatriene, and the Diels-Alder reaction product between (A) 1,3-cyclopentadiene or 1,3-cyclohexadiene, and (B) the cyclic non-conjugated polyunsaturated hydrocarbons possessing:

(1) at least eight carbons and not more than twelve carbons in the ring;
(2) possesses within the ring at least two vinylenic units of the type —CH=CH—;
(3) the non-conjugated polyunsaturated hydrocarbon may be substituted by hydrogen, alkyl or aryl radicals in any of the ring carbons other than the vinylenic carbons designated in (2) above;
(4) be free from non-aromatic conjugated double bonds; and
(5) be free of acetylene-type unsaturation.

Representative examples of the cyclic non-conjugated polyunsaturated hydrocarbons involved in the Diels-Alder condensation are 1,4-cyclooctadiene; 1,5-cyclooctadiene; 3-methyl-1,5-cyclooctadiene; 3-phenyl-1,5-cyclooctadiene; 1,5-cyclononadiene; 1,5 - cyclododecadiene; 1,6 - cyclododecadiene; 1,5,9-cyclododecatriene; 1-methyl-1,5,9-cyclododecatriene and the like.

The conjugated cyclic diolefins useful in this invention may be represented by 1,3-cyclopentadiene, 1,3-cyclohexadiene, 5-methyl-1,3-cyclopentadiene, 1-methyl-1,3-cyclopentadiene, 1-phenyl-1,3-cyclopentadiene, 1-methyl-1,3-cyclohexadiene and the like. The dimer of cyclopentadiene may also be employed.

As indicated, this invention is directed to the interpolymers of cycloolefins and polyunsaturated polycyclic hydrocarbons obtained by the Diels-Alder condensation between (A) a cyclic conjugated diolefin and (B) a cyclic non-conjugated polyunsaturated hydrocarbon containing at least eight carbon atoms in the ring.

To form this polyunsaturated polycyclic compound requires the condensation of a cyclic diolefin and a cyclic non-conjugated polyunsaturated hydrocarbon. This Diels-Alder reaction can be carried out at autogenous pressures in a closed inert reactor at temperatures ranging between 150° C. and 250° C. for periods of time from about 1 to about 24 hours. The reaction may be carried out in the absence of the solvent but more suitably in the presence of an inert solvent such as hexane, cyclohexane, benzene, toluene and the like. The mole ratio of the cyclic nonconjugated polyunsaturated hydrocarbon to the cyclic conjugated diolefin should be greater than 1/1 and preferably between 3/1 and 20/1.

The interpolymers of this invention that are useful could be used to form solid highly crosslinked polymers which could be polymerized in place to form a finished rubber-like article.

The interpolymers of the invention are produced by what is known as ring opening polymerizations. For instance, in the Journal of Polymer Science: Part A-1, vol. 5, 2209-2217 (1967), there is disclosed that the ring opening polymerization of cyclooctene, cyclododecene, 1,5-cyclooctadiene, 1,5,9-cyclododecatriene and substituted cycloolefins can be polymerized by a two component catalyst system composed of ethylaluminum dichloride and tungsten hexachloride to form polyalkenamers which are elastomeric in nature and are, therefore, useful as a new class of synthetic rubber. The products of this invention such as tricyclo[8.2.1.0$^{2,9}$]trideca-5,11-diene can be employed in these polymerization reactions in small amounts to provide a crosslinked network of such polyalkenamers. Thus, the products resulting from the ring opening polymerization of cycloolefins and tricyclo[8.2.1.0$^{2,9}$]trideca-5,11-diene would be termed interpolymers.

Also within the scope of this invention are the interpolymers of alpha olefins such as ethylene, propylene, the butenes and the like with the Diels-Alder reaction product of a conjugated cyclic diolefin and a non-conjugated cyclic diolefin. It is known that when such alpha olefins are interpolymerized by known techniques, they are more useful when small amounts of diolefins are employed to give sites of unsaturation so that such interpolymers can be cured by conventional means. For instance, the commercial ethylene/propylene/diolefin polymers (EPDM) contain small quantities of 1,4-hexadiene, dicyclopentadiene, ethylidenenorbornene and the like. The incorporation of the Diels-Alder products of conjugated cyclic diolefins and non-conjugated cyclic diolefins such as tricyclo[8,2,1,0$^{2,9}$]trideca-5,11-diene can be incorporated in, for instance, an interpolymer of ethylene and propylene to form still a different EPDM than those commercially available.

This invention is further illustrated by reference to the following examples which are intended to be representative rather than restrictive of the scope of this invention.

EXAMPLE 1

In a one-gallon stainless steel autoclave there was heated at 210° C. for 5 hours, 2012 grams of 1,5-cyclooctadiene and 185 grams of dicyclopentadiene. The reaction mixture was removed at the end of 5 hours and fractionally distilled under vacuum to give 1807 grams of 1,5-cyclooctadiene (boiling at about 35° C. to 40° C. at 10 mm. of Hg) and 247 grams of a compound boiling at about 70/85° C. at 1 mm. Hg. This latter material was analyzed by conventional infrared spectrographic techniques, nuclear magnetic resonance and gas-liquid chromatography techniques and was determined to be tricyclo-[8.2.1.0$^{2,9}$]trideca-5,11-diene.

The Diels-Alder reaction product of a conjugated cyclic diolefin and a non-conjugated cyclic diolefin is next reacted with a cyclic olefin to produce the products of this invention.

EXAMPLE 2

In order to demonstrate the effect of increasing the molecular weight and the inherent viscosity of a polymer obtained by varying the amounts of the reaction product obtained by the Diels-Alder reaction of dicyclopentadiene and 1,5-cyclooctadiene, there was added cyclopentene containing traces of cyclic olefinic impurities (0.1% 2-pentene and 0.05% 1-pentene).

In these polymerizations which were conducted at 90 minutes at room temperature, to 40 milliliters (ml.) of a solution of a cyclopentene in benzene containing 8.1 grams of cyclopentene per 40 ml. of solution was added 0.2 ml. of 0.1 molar trichlorophenol, 0.4 ml. of 0.05 molar tungsten hexachloride, and 0.3 ml. of 0.2 molar ethylaluminum dichloride. Varying amounts of the Diels-Alder reaction product of cyclopentadiene with cyclooctadiene were added as indicated in the table below.

In this table, column 1 is the experiment number, column 2 is the weight percent of the Diels-Alder reaction product of cyclooctadiene and cyclopentadiene; column 3 is the yield in weight percent of polymer obtained; column 4 is the inherent viscosity run in benzene at 30° C. and coluumn 5 is the percent gel obtained.

TABLE 1

| Experiment number | Weight percent | Yield, weight percent | Inherent viscosity | Percent gel |
| --- | --- | --- | --- | --- |
| 1 | 0 | 67.1 | 0.76 | 3.7 |
| 2 | 0.8 | 68.9 | 1.38 | 2.8 |
| 3 | 2.0 | 66.8 | 0.52 | 64.4 |
| 4 | 4.1 | 66.8 | 0.04 | 83.0 |

Thus, it can be seen that in the polymerization of cyclopentene the gel contents of the interpolymers can be increased considerably by the addition of small amounts of a comonomer which is the Diels-Alder reaction between a cyclic conjugated diolefin and a cyclic non-conjugated polyunsaturated hydrocarbon having at least eight carbon atoms in the ring.

The weight percent of the polyunsaturated polycyclic hydrocarbon to the percent of total monomer in the interpolymer should range from 0.1% to 10% with 0.2% to 2.0% being more preferred.

While certain representative embodiments and details have been shown for the purpose of illustrating the invention, it will be apparent to those skilled in this art that various changes and modifications may be made therein without departing from the spirit or scope of the invention.

What is claimed is:

1. An interpolymer of cycloolefins and a Diels-Alder reaction product produced by the process of polymerizing with a tungsten-based ring-opening catalyst, a cycloolefin selected from the group of cyclopentene, cyclooctene, 1,5-cyclooctadiene, cyclododecene and 1,5,9-cyclododecatriene; and the Diels-Alder reaction product of a cyclic conjugated diene selected from the group consisting of 1,3-cyclopentadienes of the formula:

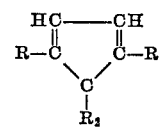

and 1,3-cyclohexadienes of the formula:

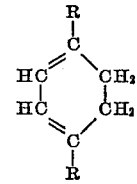

in which the R groups may be hydrogen or an alkyl or aryl radical and can be the same or different with a cyclic nonconjugated polyunsaturated hydrocarbon which:

(a) possesses at least eight and not more than twelve carbon atoms in the ring, (b) possesses within the ring at least two vinylenic units of the type —CH=CH—,
(c) may be substituted by hydrogen, alkyl or aryl radicals at any of the ring carbons other than the vinylenic carbons designated in (b) above,
(d) is free of non-aromatic conjugated units, and
(e) is free of acetylenic type of unsaturation, in which the weight percent of the Diels-Alder reaction product is from 0.1% to 10%.

2. An interpolymer according to claim 1 wherein the Diels-Alder reaction product is tricyclo[8.2.1.0$^{2,9}$]trideca-5,11-diene.

References Cited
UNITED STATES PATENTS

| | | | |
|---|---|---|---|
| 3,449,310 | 6/1969 | Dall'Asta | 260—93.1 |
| 3,502,626 | 3/1970 | Dall'Asta | 260—80.78 |
| 3,575,947 | 4/1971 | Crain | 260—93.1 |

JOSEPH L. SCHOFER, Primary Examiner

R. S. BENJAMIN, Assistant Examiner